No. 717,155. Patented Dec. 30, 1902.
E. BASEMAN.
FURROW OPENER FOR SEEDING MACHINES.
(Application filed Oct. 18, 1902.)
(No Model.)
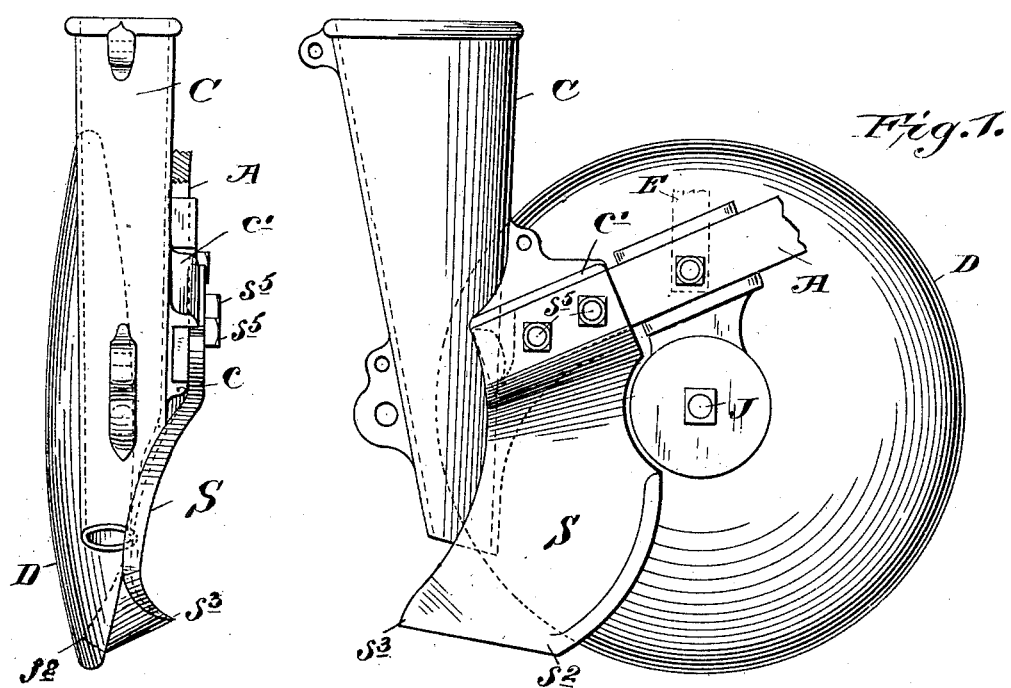
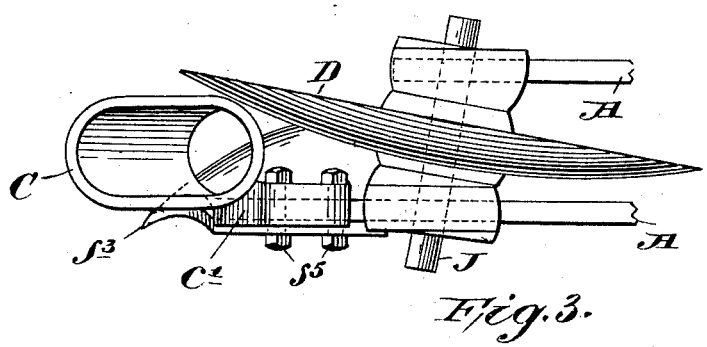
WITNESSES:
INVENTOR
Ernest Baseman.
BY
ATTORNEY

UNITED STATES PATENT OFFICE.

ERNEST BASEMAN, OF MACEDON, NEW YORK, ASSIGNOR TO BICKFORD AND HUFFMAN COMPANY, OF MACEDON, NEW YORK, A CORPORATION OF NEW YORK.

FURROW-OPENER FOR SEEDING-MACHINES.

SPECIFICATION forming part of Letters Patent No. 717,155, dated December 30, 1902.

Application filed October 18, 1902. Serial No. 127,778. (No model.)

*To all whom it may concern:*

Be it known that I, ERNEST BASEMAN, a citizen of the United States, residing at Macedon, in the county of Wayne and State of New York, have invented certain new and useful Improvements in Furrow-Openers for Seeding-Machines, of which the following is a specification.

My invention relates to seeding-machines or grain-drills, and more particularly to that class of seeding-machines provided with rotating disks or colters which in the operation of the machine cut or open furrows wherein the grain or seed is deposited. These seeding-machines are known in the art as "disk drills" and are ordinarily constructed with disks journaled to rotate at an angle relative to the line of motion on which they are made to travel when passing through the soil, and as a consequence the furrows formed thereby approximate more or less closely to a V shape—that is to say, the furrow is broader at the top than at the bottom. When this form of disk drill is employed, it often happens, due to the inclined sides of the V-shaped furrow, that the grain or seed deposited at the apex thereof has insufficient space for proper germination and that the plant is liable to be root-bound and stunted in its growth.

It is the object of my invention to obviate this difficulty and to form a furrow with a flat and wider seed-bed. To this end I propose to construct and arrange a piece or plate distinct from the conduit in such manner that it will not be entirely contained within the furrow formed by the disk, but will extend to one side thereof, so as to coöperate with the disk in the cutting of the furrow and to form it with a broader bed.

My invention consists in the construction and combination of parts now to be described in the specification and finally pointed out in the claims.

Referring to the drawings, wherein the same parts are designated by the same letters of reference throughout, Figure 1 is a view of a single disk, plate, and conduit and shows also the side bar and the point of connection for raising and lowering the parts. Fig. 2 is a rear elevation showing the relation of the conduit and plate to the disk. Fig. 3 shows in plan view the arrangement of the disk with reference to the side bar and the location of the conduit and plate in relation thereto.

It will of course be understood that my invention may be applied to any suitable form of grain-drill mechanism and that any desired number of furrow-openers may be connected thereto. For the purposes of illustration I have shown only a single set of the connected parts.

The frame or side bars A A may be of any suitable or desired construction. Suitably journaled at J, near the rear of the side bars, is a disk D, which is shown in the drawings as concavo-convex or saucer-shaped and as journaled at an angle to the line of draft and in such manner that the lower edge of the disk will enter the soil and cut into it by reason of the engagement of its concave side therewith. The grain conduit or tube C may be attached to one of the side bars A A behind the journal J of the disk D in any suitable manner, it being provided with two parallel ribs $c$ $c'$, between which is inserted the end of the bar A, which is then bolted at $s^5$ $s^5$ or otherwise removably connected to the conduit. The plate or piece S may also be connected to the side bar A and is shown in the drawings as secured thereto by the same bolts $s^5$ $s^5$. The front edge of the plate or piece S below the side bar A is inclined inwardly and made to conform in shape to the convex side of the disk D in the manner well understood and extends downwardly to a point $s^2$ nearly on a level with the lower or cutting edge of the disk D. From the point $s^2$ the lower or cutting edge of the plate S extends horizontally to the rear and is also flared outwardly away from the disk to a point $s^3$ in a manner similar to the moldboard of a plow, as clearly shown in the drawings, so that it projects considerably beyond the cutting-line of the disk, and therefore beyond the furrow which would be formed by the disk D if employed alone. The result of this formation is that during the forward movement of the disk D a furrow will be opened in the soil by the entrance into it of the concave edge of the disk, which will penetrate and lift the soil on the one side, and at practically the same instant the soil on the convex side of the disk D will be engaged by the horizontal cutting edge of the plate S at or near the point $s^2$, and as the plate S moves forward the soil will be penetrated and lifted by its lower flaring edge in substantially the same manner that it is penetrated and raised by the concave edge at the other side of the disk, and a furrow will thus be formed having a broader and flatter seed-bed than would be secured in the use of the disk alone. While the furrow is being formed in the manner just described the grain or seed may be deposited therein through the conduit C, its inner formation being clearly shown in Fig. 3 and also by dotted lines in the other figures, the general slope of which conducts the seed or grain to a point within the furrow opened and maintained by the disk D and plate S. As the disk and plate move forward in the further operation of the machine the portion of the furrow opened and maintained by the lower edge of the plate S will pass over the rear point $s^3$ thereof and fall upon the grain already deposited.

The side or drag bars A A may be attached to the machine in any suitable manner.

A lifting-strap E may be connected to the side bar A at its lower end, as indicated by dotted lines in Fig. 1, and may be attached at its upper end to any suitable mechanism for raising and lowering the disks. This, however, forms no part of my present invention.

I believe that my construction as above described is well adapted to obviate the objections arising from the V-shaped furrow and to form a broad and flat seed-bed, upon which the seed is scattered and immediately covered by the soil falling back from the curved edge of the plate, thereby avoiding the congested condition so common to the rows of grain when planted in a V-shaped furrow and affording the best possible conditions for germination and development.

Another advantage arising from my invention is that the horizontal cutting edge of the plate, which coöperates with the disk in the moving and uplifting of the soil, but in the opposite direction to the action of the disk, has a tendency to counterbalance the side draft incidental to the action of all disks when set at an angle relative to motion and, more than this, assists to some extent in holding the disk more positively down to its work.

In Letters Patent of the United States granted to James Samuel Heath and myself as joint inventors, No. 711,626, on the 21st day of October, 1902, for an improvement in furrow-openers for seeding-machines there is shown and described an arrangement whereby the furrow is formed at one side by the edge of an angularly-inclined disk and at the other side by the conduit or a device connected thereto which projects beyond the cutting line of the disk. My present invention contemplates the employment, in connection with an angularly-inclined disk, of a furrow-opening plate or moldboard which is distinct and separate from the conduit, the latter being employed simply to deliver the grain within the furrow and having no effect or function in the opening thereof.

I have herein described a preferred form of my improved furrow-opener; but it will be obvious that many changes and variations may be made therein without departing from the spirit of my invention. Thus, for instance, the plate and conduit may be differently located or secured on the disk-supporting frame, or the conduit may be entirely disconnected from the frame, or the furrow-opening plate may be separately supported, or other changes may be made which would still be comprised within the gist of my invention, which consists, broadly, in the combination of an angularly-inclined rotatable disk and a piece mounted in proximity thereto and projecting beyond the cutting-line of the disk, so as to constitute a furrow-opener therewith, and a separate conduit to deposit grain or seed in the furrow formed thereby.

Having thus described my invention, its construction and mode of operation, what I claim, and desire to secure by Letters Patent of the United States, is as follows:

1. In a seeding-machine, the combination of an angularly-inclined rotatable disk and a piece located in proximity thereto and projecting beyond the cutting-line thereof, the whole forming a furrow-opener, together with a conduit to deposit grain or seed in the furrow.

2. In a seeding-machine, the combination of an angularly-inclined rotatable disk and a piece located in proximity thereto and projecting beyond the cutting-line thereof, the lower edge of the piece being curved to raise the soil, the whole constituting a furrow-opener, together with a conduit to deposit grain or seed in the furrow.

3. In a seeding-machine, the combination of an angularly-inclined rotatable disk and a piece provided with one edge conforming to the shape of the disk and a lower flaring edge which projects beyond the cutting-line of the disk, the whole constituting a furrow-opener, together with a conduit to deposit grain or seed in the furrow.

4. In a seeding-machine, the combination of an angularly-inclined rotatable disk and a piece provided with a lower flaring edge which coacts with the disk in the opening of a furrow, together with a conduit to deposit grain or seed therein.

5. In a seeding-machine, the combination of an angularly-inclined rotatable disk and a piece provided with one edge conforming to the shape of the disk, and a lower flaring edge which coacts with the disk in the opening of a furrow, together with a conduit to deposit grain or seed therein.

In testimony whereof I have signed my name to this specification in the presence of two subscribing witnesses.

ERNEST BASEMAN.

Witnesses:
 D. C. TICKNOR,
 BURROWS MCNEIR.